Dec. 2 1952 F. M. TOMLIN 2,620,080
GUARD AND LOCATER FOR ELECTRICAL OUTLET BOXES
Filed April 18, 1949

Inventor

Frederick M. Tomlin

By Clarence A. O'Brien
and Harvey B. Jacobson
Attorneys

Patented Dec. 2, 1952

2,620,080

UNITED STATES PATENT OFFICE 2,620,080

GUARD AND LOCATER FOR ELECTRICAL OUTLET BOXES

Frederick M. Tomlin, Detroit, Mich.

Application April 18, 1949, Serial No. 88,118

2 Claims. (Cl. 220—3.4)

My invention relates to improvements in guards and locaters for electrical outlet boxes such as are used in walls for electric switch parts, and the like.

By way of premise, electrical outlet boxes, which are installed in walls with the front open, are frequently buried and covered over by careless plasterers and the boxes smeared and partly filled with plaster. Such buried outlet boxes must be located by tapping on the wall; then an opening in the plaster to the box must be cut by chiselling through the plaster; and the boxes must be cleaned of plaster adhering thereto before the electrician can install the switch parts and finish plates for the boxes. Often the plaster around the boxes is damaged in forming the opening and requires pointing up, and if the wall has been painted, the painting around the formed opening is ruined and must be replaced. All this takes time and labor and results in increased construction costs in buildings.

With the foregoing in mind, the primary object of my invention is to provide labor and time-saving means for locating electrical outlet boxes buried behind plaster, together with means for maintaining such boxes clean of plaster and for quickly and easily forming a clean-cut opening in the plaster around the buried boxes for access thereto.

Another object is to provide means of the character and for the purposes above set forth adapted to be easily applied to conventional electrical outlet boxes without altering the boxes, and which is inexpensive to manufacture and use.

Other and subordinate objects, within the purview of my invention, together with the precise nature of my improvements, will be readily understood when the succeeding description and claims are read with reference to the drawing accompanying and forming a part of this specification.

Figure 2:
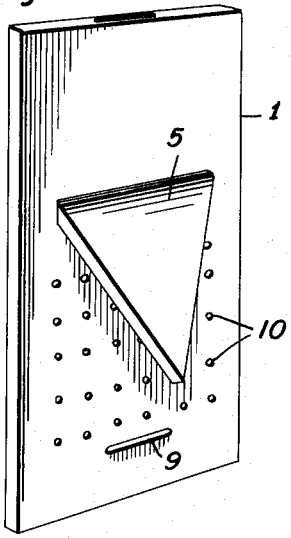
Figure 2 is a view in perspective of the guard and locater viewed from the front thereof and drawn to a smaller scale.
Figure 1:
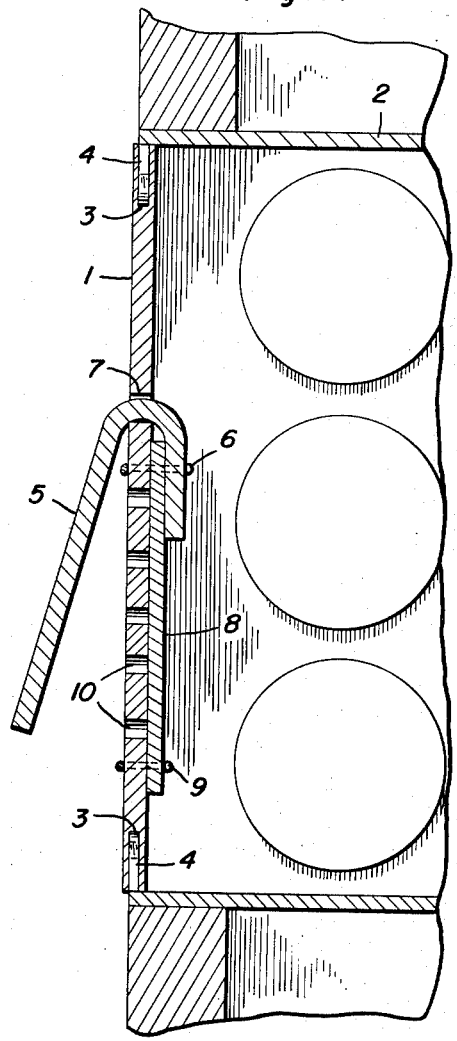
Figure 1 is a fragmentary view in vertical section illustrating my improved guard and locater, in a preferred embodiment thereof, applied to an electrical outlet box.
Figure 3:
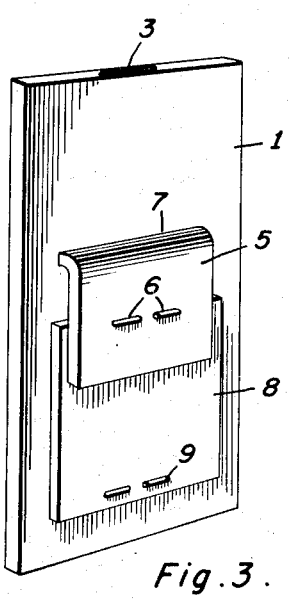
Figure 3 is a similar view looking at the rear of the guard and locater.

Referring to the drawing by numerals, according to my invention, as illustrated, a rectangular guard plate 1 is provided for an electrical outlet box 2 of the requisite size to fit in and close the open front of said box.

A pair of suitable recesses 3 are formed in opposite ends of said plate 1 which fit over the usual pair of internal, front, apertured ears 4 provided at the ends of the box 1 for attaching the usual switch parts, not shown, in the box.

The guard plate 1 is formed of a suitable, semi-rigid, inexpensive material, such as heavy cardboard, which is sufficiently flexible for bending to insert the recesses 3 over the ears 4 so that said plate may be detachably attached to the box 1 easily and quickly, without special fasteners.

An elongated tab 5 of the same material as the guard plate 1 is attached at one end thereof, by a staple 6, to the guard plate 1 in the rear of and intermediate the ends and sides of said plate to extend forwardly through a slot 7 in said plate and project for a substantial distance forwardly of the plate. The projecting portion of the tab 3 may be tapered, to economize in material, and forms both a locater for the electrical outlet box 1, and a hand grip for detaching the guard plate 1, in a manner presently explained.

A pad 8 of suitable absorbent material, for instance, blotting paper, is attached at one end to the rear side of the guard plate 1 by the staple 6 with said end interposed between said plate and the attached end of the tab 5, the other end of said pad 8 being attached to said plate 1 by another staple 9. Perforations 10 are provided in the guard plate 1 in front of the pad 8, the function of which, together with that of the pad 8, will presently appear. The pad 8 is adapted to be impregnated with a suitable dry or viscous dye which, when subjected to the action of moisture, will liquefy and seep through the perforations 10. Such a dye may be formed of an aniline or coal tar dye mixed with a 3% solution of citric acid.

Referring now to the use and operation of the described invention, with the guard plate 1 attached in the electrical outlet box 2, as described, if a plasterer covers said box so as to conceal or bury the same, the tab 5 will, under usual plastering operations, protrude through the plaster so that the box 2 may be located behind the covering plaster. Then, by pulling on the tab 5, first toward one end of said box 1 and then toward the other, the guard plate 1 may be bent or flexed so as to detach the ends thereof from the ears 4, and said plate may then be pulled through the plaster, while wet, to form a clean-cut opening in the wet plaster to said box. Obviously, by such pulling on the tab 5, some of the wet plaster around the tab and in front of the plate 1 may be dislodged so that the plate 1 may be easily pulled through the remaining plaster covering the same. As will be obvious, the guard plate 1 prevents the plaster from entering said box 1, and the ears 4 from being smeared with plaster so as to necessitate cutting out the plaster in the apertures, not shown, of the ears, and chiselling the plaster off of the ears. Even though the guard plate 1 is not covered with plaster but said box 2 has been plastered over around its edges and those of said plate, the guard plate may be used as described to form a clean-cut opening around said box.

The dye impregnated pad 8 and perforations 10 constitute an additional safety provision for locating the electrical outlet box 2, when buried, in case the plasterer carelessly buries the tab 5 along with said box, the dye in the pad 8, as a result of being subjected to moisture from the wet plaster, seeping through the perforations 10 and discoloring the plaster in front of said plate 1 so that the location of said box is thereby disclosed.

When the invention has been used and detached, as described, it may be discarded, as the same may be so inexpensively manufactured, of the material specified, that it can be replaced with negligible cost.

The foregoing will, it is believed, suffice to impart a clear understanding of my invention without further explanation.

Manifestly, the invention, as described, is susceptible of modification, without departing from the inventive concept, and right is herein reserved to such modifications as fall within the scope of the appended claims.

Having described my invention, what is claimed as new is:

1. Means for locating an electrical outlet box behind wet plaster comprising a plate for attachment to said box, means to attach said plate to said box to lie between the same and said plaster, and means on said plate rendered effective under the action of moisture in said plaster to discolor the plaster and thereby indicate the location of said box, comprising a back pad on said plate impregnated with dye adapted to liquefy when subjected to the action of moisture, said plate having perforations therein in front of said pad for passage of the liquefied dye therethrough to the plaster.

2. Means for locating behind wet plaster an electrical outlet box having an open front with internal lugs at opposite front edges thereof, said means comprising a plate fitting into said open front with edge recesses therein for receiving said lugs to attach said plate in said box, said plate being flexible for bending to withdraw said lugs from said recesses to detach said plate for pulling out of said box through the wet plaster to form an opening in the plaster at the front of the box, a front, central hand grip tab on said plate for pulling thereon to bend the plate and pull the same out of the box and being flexible for manipulation in the plaster in opposite directions to dislodge some of the wet plaster in front of the plate and thereby render pulling of the plate through the wet plaster easier, and means on said plate rendered effective under the action of moisture in the plaster to discolor the plaster and thereby indicate the location of the box.

FREDERICK M. TOMLIN.

REFERENCES CITED

The following references are of record in the file of this patent:

UNITED STATES PATENTS

| Number | Name | Date |
|---|---|---|
| 1,758,126 | Peterson | May 13, 1930 |
| 2,497,928 | Cafiero | Feb. 21, 1950 |